United States Patent [19]
Bogan et al.

[11] Patent Number: 4,746,727
[45] Date of Patent: * May 24, 1988

[54] CURABLE COMPOSITION FROM ETHYLENICALLY UNSATURATED MONOMERS AND POLYARYLCYANATE ESTER COMPOSITION

[75] Inventors: Gary W. Bogan, Lake Jackson, Tex.; Peter A. Lucas, Allentown, Pa.

[73] Assignee: The Dow Chemical Company, Midland, Mich.

[*] Notice: The portion of the term of this patent subsequent to Oct. 16, 2001 has been disclaimed.

[21] Appl. No.: 828,465

[22] Filed: Feb. 11, 1986

[51] Int. Cl.[4] .............................................. C08G 83/00
[52] U.S. Cl. .................................. 528/392; 528/119; 528/271; 528/363; 528/422; 528/425
[58] Field of Search ............... 528/392, 422, 425, 119, 528/271, 363

[56] References Cited

U.S. PATENT DOCUMENTS

| | | | |
|---|---|---|---|
| 4,469,859 | 9/1984 | Gaku et al. | 528/392 |
| 4,477,629 | 10/1984 | Hefner | 525/113 |
| 4,559,399 | 12/1985 | Hefner | 528/392 |
| 4,581,425 | 4/1986 | Hefner | 528/392 |
| 4,600,760 | 7/1986 | Hefner | 526/262 |

Primary Examiner—Harold D. Anderson

[57] ABSTRACT

Polymeric compositions are prepared from ethylenically unsaturated monomeric compositions and polyarylcyanate ester compositions which have at least two arylcyanate ester moieties bridged by a polycyclic aliphatic moiety; and wherein the polyarylcyanate ester composition is substantially soluble in the ethylenically unsaturated monomeric composition.

17 Claims, No Drawings

CURABLE COMPOSITION FROM ETHYLENICALLY UNSATURATED MONOMERS AND POLYARYLCYANATE ESTER COMPOSITION

BACKGROUND OF THE INVENTION

This invention relates to curable compositions of polyarylcyanate ester compositions and copolymerizable ethylenically unsaturated monomeric compositions, and to cured resins prepared from the compositions.

Thermoset resins are used in many engineering applications as fiber-reinforced plastics and composites, molded articles, coatings, adhesives and the like. It is desirable that such resins possess temperature and chemical resistance, and are readily processable in molding, extrusion, and hand lay-up processes.

The resins prepared from polyfunctional cyanate esters exhibit good temperature and chemical resistance properties. Such resins copolymerized with maleimide monomers are disclosed in U.S. Pat. Nos. 4,469,859; 4,404,330; 4,396,745; 4,383,903; 4,373,086; 4,371,689; 4,369,304; 4,287,014 and 4,110,364. To prepare the resins, separate prepolymer compositions of the cyanate ester, the maleimide, and other comonomer must first be prepared. Such a processing step substantially detracts from the processability and desirability of the resins.

Furthermore, the curable and prepolymer polyfunctional cyanate ester compositions are highly viscous. Such high viscosity inhibits the use of these compositions in applications which require low viscosity compositions. Examples of such applications are filament-wound pipe, electrical laminates, coatings, and structural composites.

Therefore, it would be desirable to have curable polyarylcyanate ester compositions which have improved processability. It would also be desirable that the improved processability would not detract from the physical properties of the cured compositions.

SUMMARY OF THE INVENTION

This invention is a curable composition comprising an ethylenically unsaturated monomeric composition and a major amount of a polyarylcyanate ester composition. The polyarylcyanate ester composition has at least two arylcyanate ester moieties bridged by a polycyclic aliphatic moiety, and is substantially soluble in the ethylenically unsaturated monomeric composition.

The polyarylcyanate ester compositions are highly viscous and in a substantially semi-solid form (i.e., in the form of a thick syrup). The ethylenically unsaturated monomers are copolymerizable with the polyarylcyanate ester compositions, and are in the form of a liquid. The ethylenically unsaturated monomer functions as a reactive diluent, i.e., it can react with the polyarylcyanate esters and can reduce the viscosity of such compositions. It is employed in a viscosity reducing amount.

In another aspect, this invention is a polymeric composition comprising in polymerized form an ethylenically unsaturated monomeric composition and a polyarylcyanate ester composition.

Surprisingly, the curable composition has a much lower viscosity than the polyarylcyanate ester composition alone. Furthermore, upon curing the composition, the cured composition substantially retains its thermal resistance properties such as glass transition temperature and degradation onset temperature. Moreover, the cured composition can exhibit improved physical properties such as flexural strength and moisture resistance, and electrical properties such as dielectric constant.

Upon curing, the composition is useful in many engineering thermoset resin applications. Such resins can be used in the electronics field as encapsulation resins, laminates for electronic circuit boards, inner-layer dielectrics, and the like. The lower viscosity of the curable composition renders it more readily processable in applications such as in preparing filament-wound pipe, electrical laminates, coatings, and structural composites.

DETAILED DESCRIPTION OF THE INVENTION

The curable composition of this invention is a composition which contains polymerization sites and which can be polymerized to form a solid part. The composition comprises a polyarylcyanate ester composition and at least one ethylenically unsaturated monomer. Additionally, the composition can include reinforcing materials such as glass fibers, graphite fibers, metal powders and ceramic powders to provide the cured composition with certain physical properties. Further, the composition can contain other comonomers or compositions which are copolymerizable with the polyarylcyanate ester and/or ethylenically unsaturated monomer. The composition can also contain compositions which improve the solubility or compatibility of the polyarylcyanate ester composition in the ethylenically unsaturated monomeric composition.

The preferred polyfunctional arylcyanate ester compositions of this invention correspond to the formula:

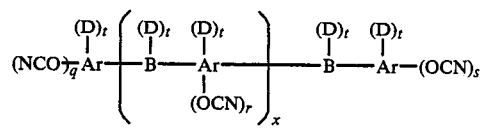

wherein:
Ar is an aromatic moiety;
B is a $C_{7-20}$ polycyclic aliphatic moiety;
D is independently, in each occurrence, any nonactive hydrogen-containing substituent;
q, r and s are independently, in each occurrence, an integer of 0, 1, 2, or 3; with the proviso that the sum of q, r and s is at least 2;
t is independently, in each occurrence, an integer of up to 4, inclusive; and
x is a number up to 5, inclusive.

The polyarylcyanate ester composition is a composition which can be polymerized. The composition can be comprised of monomers, oligomers, or a mixture of monomers and oligomers corresponding to the above formula. The mixtures can be referred to as having an average cyanate ester functionality which refers to the average number of cyanate ester groups per molecular unit.

The aromatic moiety is a cyclic carbon-containing moiety which exhibits the $(4N+2)\pi$ electron configuration as described in, for example, Morrison & Boyd, *Organic Chemistry*, 3rd Ed., 1973. Suitable aryl moieties include cyclic hydrocarbon moieties such as benzene, naphthalene, phenanthrene, anthracene, biaromatic moieties, or 2 or more aromatic moieties bridged by alkylene moieties. Also, heterocyclic moieties such as pyridine are suitable. Preferably, the aromatic moiety is a benzene, naphthalene, biphenyl, binaphthal, or diphenyl alkylene moiety. Most preferably, the aryl moiety is a benzene moiety.

The arylcyanate ester moieties are bridged by polycyclic aliphatic bridging moieties. Polycyclic aliphatic bridging moieties provide improved moisture resistance and electrical properties to the polymeric composition compared to aromatic bridging members. Also, the polycyclic aliphatic moieties provide improved mechanical strength and heat resistance to the polymeric composition compared to straight chain aliphatic bridging members.

Polycyclic aliphatic moiety (B) refers herein to an aliphatic moiety which contains two or more cyclic rings. The polycyclic aliphatic moieties can contain one or more double or triple bonds, provided that formation of an aromatic moiety from the cyclic aliphatic moiety is avoided. Examples of suitable polycyclic aliphatic moieties correspond to the formulae

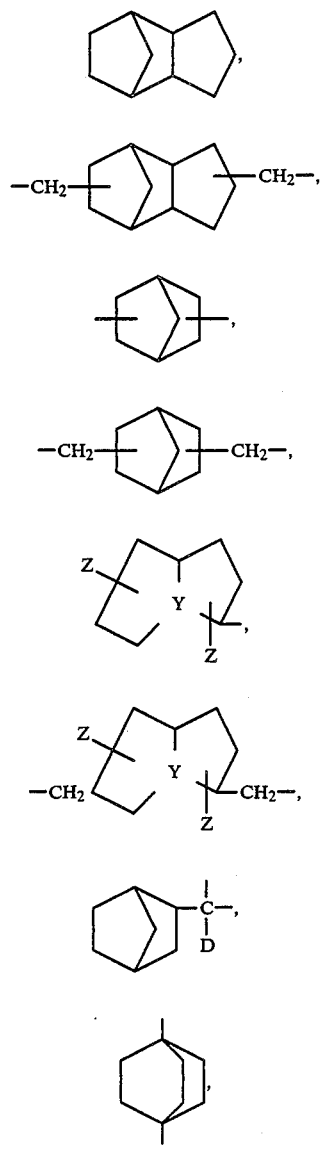

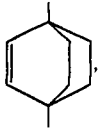

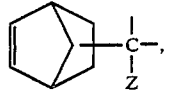

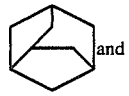

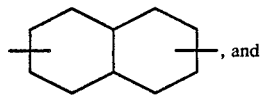

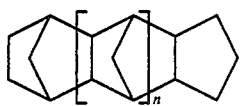

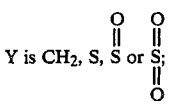

wherein:

$$Y \text{ is } CH_2, S, \overset{O}{\underset{}{\overset{\|}{S}}} \text{ or } \overset{O}{\underset{\overset{\|}{O}}{\overset{\|}{S}}};$$

n is an integer of 1 to 3, inclusive; and Z is independently, in each occurrence, a $C_{1-5}$ alkyl moiety.

D and Z are separately substituents which can be substituted on a hydrocarbon moiety, with the exception that the substituent cannot contain an active hydrogen atom. An active hydrogen atom is a hydrogen atom which is bonded to an oxygen, carbon sulfur or nitrogen atom. Examples of substituents within the scope of D and Z include alkyl, alkenyl, alkynyl, aryl, alkaryl aralkyl, halo, alkoxy, nitro, carboxylate, sulfone, sulfide or carbonate moieties. Preferred substituents are $C_{1-10}$ alkyl, $C_{1-10}$ alkenyl, nitro, and halo moieties, with $C_{1-3}$ alkyl, $C_{1-3}$ alkynyl, bromo and chloro moieties being more preferred.

Preferably, q, r and s are independently 1 or 2, and are most preferably 1. Preferably, t is independently an integer of 0, 1 or 2, more preferably 0 or 1, and most preferably 0. Preferably, x is a number up to about 2, inclusive, and more preferably up to about 1, inclusive.

The polyarylcyanate ester compositions of this invention can be in the form of a mixture of many isomers. Further, these polyarylcyanate ester compositions can be a mixture of compounds in which x is a number of up to about 5. The number given for x in a particular mixture is an average number.

Preferably, the polycyclic aliphatic moiety is a moiety which corresponds to one of the formulae II, III, IV, V, VI, VII, VIII or XIII with moieties corresponding to formulae II, III, IV, V or XIII being even more preferred, and moieties corresponding to formula II being most preferred.

The most preferred polyarylcyanate ester compositions correspond to the formula

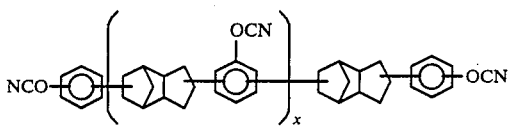

wherein x is a real number of up to about 5, inclusive.

The polyarylcyanate ester compositions of this invention can be prepared by contacting a hydroxyl-containing aromatic compound with a cyanogen halide in the presence of a tertiary amine. Examples of suitable aromatic compounds are phenolic compounds. Examples of suitable cyanogen halides are cyanogen chloride, and cyanogen bromide, with cyanogen chloride being preferred.

Preferably, the cyanogen halide is prepared in situ by contacting a solution of the halide in a halogenated hydrocarbon solvent with an aqueous solution of an alkali metal cyanide. The reaction mixture can separate into an organic layer of the halogenated hydrocarbon containing the cyanogen halide and an aqueous layer containing an alkali metal halide salt. Generally, the alkali metal cyanide and halide can be reacted in a molar ratio of between 1.0:1.0 and 1.0:1.15, preferably between about 1.0:1.0 and 1.0:1.05; and most preferably about 1.0:1.0. Undesirable by-products can form if an excess of either reagent is employed. For example, an excess of halide can later react with the phenol, and excess alkali metal cyanide can result in a lower product purity. The reaction is performed at a temperature of 0° C. or below, preferably less than −15° C. Above 0° C. the cyanogen halide can trimerize. Preferably, chlorine is chosen as the halide. Preferable solvents for chlorine are the aliphatic chlorinated hydrocarbons, such as methylene chloride, chloroform, 1,1,1-trichloroethane and the like. The preferred alkali metal cyanide is sodium cyanide.

The aqueous layer and organic layer can be separated. The separation of the organic layer from the aqueous layer is advantageous as the presence of the aqueous layer in further processing adversely affects the purity of the polyaromatic cyanates eventually prepared.

The organic layer containing the cyanogen halide can be contacted with a polycyclic bridged hydroxy-substituted polyaryl compound dissolved in a suitable solvent in the presence of a tertiary amine. A polyaryl compound contains at least two aromatic moieties.

Polycyclic bridged hydroxy-substituted polyaryl compounds useful in this process correspond to the formula

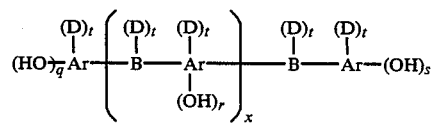

wherein Ar, B, D, q, r, s, t and x are as defined hereinbefore.

Preferably, the polycyclic bridged hydroxy-substituted polyaryl compounds correspond to the formula

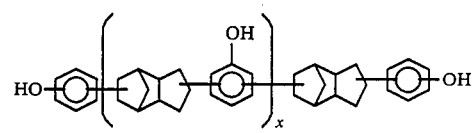

wherein x is as defined hereinbefore. The polycyclic bridged hydroxy-substituted polyaryl compounds can be in the form of a mixture of isomers, and as a mixture of compounds in which x is a number up to 5. The number given for x is an average number.

Examples of suitable solvents for the polycyclic bridged hydroxy-substituted polyaryl compounds include secondary alcohols, tertiary alcohols, or chlorinated hydrocarbons. Preferred solvents are secondary alcohols or aliphatic chlorinated hydrocarbons, with isopropyl alcohol and methylene chloride most preferred.

The polycyclic bridged hydroxy-substituted polyaryl compounds useful in this invention can be prepared by reacting a hydroxyl-containing aromatic compound which also contains one position on the aromatic ring which can be alkylated, with an unsaturated polycyclic aliphatic compound under conditions such that a polycyclic bridged hydroxy-substituted polyaryl compound is prepared.

Suitable substituted aromatic hydroxy compounds which can be employed herein include any such compounds which contain one or two aromatic rings, at least one phenolic hydroxyl group and at least one ortho or para ring position with respect to a hydroxyl group available for alkylation.

Particularly suitable hydroxy-substituted aromatic compounds which can be employed herein include, for example, phenol, chlorophenol, bromophenol, methylphenol, hydroquinone, catechol, resorcinol, guaiacol, pyrogallol, phloroglucinol, isopropylphenol, ethylphenol, propylphenol, t-butylphenol, isobutylphenol, octylphenol, nonylphenol, cumylphenol, p-phenylphenol, o-phenylphenol, m-phenylphenol, bisphenol A, dihydroxydiphenyl sulfone, mixtures thereof and the like. Preferably, the unsaturated polycyclic aliphatic compound is dicyclopentadiene.

The hydroxy-substituted polyaryl compound is contacted with the unsaturated polycyclic aliphatic compound optionally in the presence of a solvent. Preferred solvents include chlorinated hydrocarbons, aliphatic hydrocarbons, aromatic hydrocarbons and nitro-substituted hydrocarbons. In general, the hydroxy-substituted polyaromatic compound is contacted with the unsaturated polycyclic aliphatic compound in a mole ratio of between about 20.0:1.0 and 1.0:1.0, preferably between about 10.0:1.0 and 1.5:1.0.

Preferably, the hydroxy-substituted polyaryl compound and the unsaturated polycyclic aliphatic compound can be contacted in the presence of a suitable catalyst. Such catalysts can be acid catalysts, examples of which include Lewis acids, alkyl, aryl and aralkyl sulfonic acids, and disulfonic acids of diphenyloxide and alkylated diphenyloxide, sulfuric acid, metal chlorides such as aluminum chloride, zinc chloride, stannic chloride activated clays, silica, silica-aluminum complexes, mixtures thereof and the like. Preferable catalysts are such Lewis acids as BF$_3$ gas, organic complexes of boron trifluoride such as those complexes formed with phenol, cresol, ethanol, acetic acid and the like.

In preparing the compounds which contain an average of more than one phenolic hydroxyl group and more than one aromatic ring per molecule, the reaction between the phenolic hydroxyl-containing compounds and the unsaturated polycyclic aliphatic compound can be conducted at temperatures of from about 33° C. to about 270° C., preferably from about 33° C. to about 210° C.

For complete conversion of the hydroxyl moieties on the aromatic moieties to cyanate moieties, at least 1 mole of cyanogen halide for each hydroxyl equivalent is needed. Preferably, an excess of 10 mole percent of cyanogen halide for each hydroxyl equivalent is employed to ensure complete conversion.

The tertiary amine can act as a hydrohalide acceptor, and as a result a tertiary amine hydrohalide salt is a by-product of the process. Generally, at least one mole of tertiary amine for each hydroxyl equivalent is used. A hydroxyl equivalent is the average molecular weight of the polycyclic bridged hydroxy-substituted polyaryl compound divided by the average number of hydroxyl moieties per molecule.

The polyaryl cyanates can be recovered from the reaction mixture by first contacting the mixture with water to remove the tertiary amine hydrohalide salt and any excess cyanogen halide. Thereafter, the reaction mixture can be contacted with a dilute aqueous acid solution to ensure the complete removal of any residual amine. Up to about 20; preferably from about 5 to about 10 weight percent solution of hydrohalide, phosphoric or sulfuric acid can be used. The reaction mixture can then be contacted with water to remove any impurities which can be present. The reaction mixture can be dried over a desiccant to remove the water, and the solvent is stripped off.

The ethylenically unsaturated monomeric compositions of this invention comprise at least one ethylenically unsaturated monomer. Suitable monomers include vinyl monomers which contain a vinyl hydrocarbon moiety in a position which is reactive with the arylcyanate ester moieties. Examples of suitable monomers include 1,2-alkenes, ethylenically unsaturated aromatic moieties such as, for example, styrene, divinylbenzene, vinyltoluene; ethylenically unsaturated cyclic hydrocarbons such as cyclopentadiene, dicyclopentadiene and the like; vinylized epoxy resins such as the vinyl ester analogs of the diglycidyl ethers of bisphenol A such as the Derakane ® vinyl ester resins and the styrene diluted Derakane ® vinyl ester resins, acrylic esters, acrylamide monomers, and the like. Preferably, styrene, toluene, and divinylbenzene are employed. The ethylenically unsaturated monomeric compositions of this invention can be substituted with moieties which impart specialized functionality. For example, to impart fire resistance to the cured compositions, the ethylenically unsaturated monomeric composition can be substituted with a suitable halogen such as chlorine, bromine, or fluorine, with bromine being preferred. Examples of suitable fire-retardant monomers are para-bromostyrene, and a reaction product of tetra-bromo-bisphenol A and vinylbenzylchloride; with the reaction product being preferred. The ethylenically unsaturated monomeric compositions of this invention can be readily commericaly available, and the methods of making the compositions are well known in the art.

The arylcyanate ester composition is substantially soluble in the ethylenically unsaturated monomeric composition. The arylcyanate ester composition can spontaneously form a thermodynamically stable mixture in the ethylenically unsaturated monomeric composition. Such mixture can be one in which the molecules of the arylcyanate ester composition is dispersed throughout the molecules of the ethylenically unsaturated monomeric composition as well as forming a micellular or colloidal dispersion and the like.

It is advantageous that the ethylenically unsaturated monomeric composition be in the form of a liquid at between about 15° C. and 35° C., preferably about 25° C. at atmospheric pressure. However, the monomeric composition can be a solid with a low melting point of between about 35° C. and 100° C., preferably between about 40° C. and 80° C., and most preferably less than about 70° C. The polyarylcyanate ester composition can be soluble in the melted monomeric composition.

The ethylenically unsaturated monomeric compositions of this invention are employed in the curable composition in a viscosity-reducing amount. Such amount is sufficient to impart a workable viscosity to the curable composition, and/or to provide the desired properties to the cured polymeric composition. Such an amount can vary, and typically ranges up to about 50 weight percent, preferably up to about 25 weight percent, and most preferably up to about 20 weight percent of the total weight of polyarylcyanate ester composition and ethylenically unsaturated monomeric composition. It can be desirable to maintain the amount of unsaturated monomer below the stoichiometric amount, because a greater amount will produce vinyl polymerization reaction upon subjecting the curable composition to polymerization conditions. However, such polymerization can be desirable in some circumstances. In view of the fact that the ethylenically unsaturated group will have two sites which can react with an arylcyanate ester moiety, a stoichiometric amount is an amount of about two arylcyanate ester moieties per ethylenically unsaturated moiety on the ethylenically unsaturated monomer.

The stoichiometric amount can be determined by conventional means. For example, the equivalent weight of the polyarylcyanate ester composition can be determined by, for example, gel permeation chromatography. The amount (grams) of polyarylcyanate ester to be polymerized can be divided by the equivalent weight to determine the number of equivalents which are to be polymerized. Since two cyanate moieties can react with one ethylenically unsaturated moiety, the equivalents of polyarylcyanate ester are divided by two to determine the number of equivalents of ethylenically unsaturated monomer to be copolymerized. The number of equivalents of unsaturated monomer can then be multiplied by the molecular weight of the monomer to determine the amount (grams) of unsaturated monomer to be copolymerized with the polyarylcyanate ester composition.

In view of the fact that the polyarylcyanate ester composition is a semi-solid, syrup-like composition, the curable composition of arylcyanate ester composition and ethylenically unsaturated monomeric composition can have a substantially lower solution viscosity than the arylcyanate ester composition alone. The viscosity is dependent upon the amount of unsaturated monomeric composition employed. For example, the viscosity can be lowered by increasing the amount of ethylenically unsaturated monomer which is added to the curable composition. Therefore, the degree of viscosity desired can be controlled by the amount of ethylenically unsaturated monomeric composition added to the curable composition.

The curable composition is cured by heating the composition, and optionally heating in the presence of a suitable catalyst. A suitable catalyst is one which can open the ethylenically unsaturated sites on the ethylenically unsaturated monomer as well as the cyanate groups on the polyarylcyanate ester compositions. Preferred catalysts are those which are known to cyclize cyanate structures, for example, the cobalt carboxylic acid salts. Examples of preferred cobalt carboxylic acid salts are cobalt naphthenate and cobalt acetylacetonate. Cobalt naphthenate can be employed when a more rapid gelation at lower temperatures is desired, while the cobalt acetylacetonate can be employed when more extensive heating is required to complete the blending of the ethylenically unsaturated monomers and the arylcyanate ester composition. When employing cobalt acetylacetonate, the cure schedule can follow one hour at about 175° C., and two hours at about 225° C. When employing cobalt naphthenate as the catalyst, the schedule can follow one hour at about 100° C., one hour at about 175° C., and two hours at about 225° C. The catalyst is employed in an amount sufficient to cause the formation of dihydropyrimidine groups. Such an amount can vary and typically ranges from about 100 to about 1,000, preferably from about 100 to about 500 and most preferably from about 130 to 250 parts per million of total cobalt, although any effective amount can be employed.

It is desirable that, upon subjecting the curable composition to curing conditions, a dihydropyrimidine composition is formed from two arylcyanate ester moieties and one ethylenically unsaturated moiety. A polymeric composition is formed thereby which contains linking units of the following formula

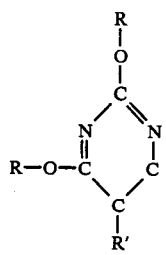

II wherein
R is the polycyclic aliphatic bridged polyaryl moiety of the polyarylcyanate ester composition and
R' is the remainder of the ethylenically unsaturated monomer described above.

DMA runs of the curing of the polyarylcyanate ester and ethylenically unsaturated monomer support the formation of dihydropyrimidine structures. A single smooth curve is produced, which suggests only one type of polymerization is occurring.

When polymerizing the preferred polyarylcyanante ester of dichclopentadiene with styrene, the polymeric composition can correspond to the formula

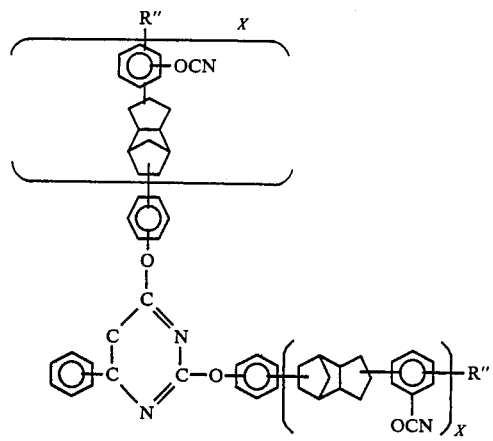

wherein
R" is the remainder of the polycyanate resin, and x is a real number of up to 5, inclusive.

An infrared spectrum analysis of a 2.2 functional polycyanate ester resin of dicyclopentadiene novolac and styrene composition indicates the presence of monosubstituted aromatic rings, and sym-triazene rings. No other extra bands are detected, but any bands for dihydropyrimidine groups would be masked by the sym-triazene bands.

As mentioned above, the polycyclic aliphatic bridging members provide overall improved physical properties to the arylcyanate ester polymeric compositions. The cured compositions of this invention exhibit excellent electrical properties. For example, the cured compositions can exhibit dielectric constants of from about 2.5 to about 3.6 even at frequencies as high as 100 kiloHz and at temperatures of as high as 150° C. The cured compositions typically exhibit a dissipation factor of from about 0.0009 to about 0.004 at 1,000 Hz at temperatures of as high as 150° C. In view of the relatively low viscosities (from about 400 cks to about 3,000 cks at 25° C.) and such excellent electrical properties, the cured compositions can find many uses in the electronics industry. Such uses include the fabrication of fiber-reinforced electronic circuit boards when employed in conjunction with eletroconductive metal sheets such as copper, as inner-layer dielectrics, as passivation and planarization resins and the like. The cured compositions also exhibit excellent thermal properties. The glass transition temperatures are consistently above 180° C. and even as high as 250° C. as measured by D.S.C. methods. Further, the cured compositions substantially retain such glass transition temperatures even after exposure to moisture; i.e., after boiling in water for 500 hours. The onset of thermodegradation as measured by T.G.A. can vary from about 350° C. to about 445° C. The cured compositions resist moisture absorption. At 121° C. and 1 atmosphere in steam, they typically exhibit moisture weight gain of less than 2½ and as low as ½ percent after 800 hours. The cured compositions also resist chemical absorption and typically gain less than 1 percent by weight after 800 hours. Moreover, after such moisture and chemical exposure, the cured compositions maintain their electrical insulative properties. The cured compositions also exhibit excellent tensile properties. Tensile stress can vary from about 5,000 to about 12,000 psi, the tensile modulus can typically vary from about $3.8 \times 10^5$ to about $5 \times 10^5$ psi and the percent elongation at break can vary from about 1.5 to about 3.5. Such properties indicate that the cured compositions are useful in preparing composites. For comparison purposes a casting made of a BT® resin, which is a bismaleimide triazine resin, the trademark of and available from the Mitsubishi Gas Chemical Company, Inc., is so brittle that tensile strength measurements cannot be made upon a casting.

The following examples are illustrative of the invention and do not limit the scope thereof.

EXAMPLES

A. Preparation of the Polyarylcyanate Resin From Dicyclopentadiene Novolac Resin Ten moles of phenol are contacted with 1 mole of dicyclopentadiene in the presence of 4.3 grams (g) BF$_3$ etherate catalyst at 145° C. for 180 minutes at ambient pressure. The reaction product is recovered by vacuum distillation of the excess phenol. The reaction product (0.95 equivalents of phenolic hydroxyl) is contacted with 1 mole of cyanogen bromide in the presence of 101 g triethylamine catalyst in a methylene chloride solvent at −10° C. for 120 minutes. The reaction product is recovered by just washing the organic solution first with 2 percent aqueous HCl, followed by 3 to 5 washes with deionized water, and then vacuum distilling the methylene chloride. The semi-solid product is the polycyanate of dicyclopentadiene novolac (DCPDPC), has an average of about 2.2 cyanate groups per molecule, and corresponds to the formula

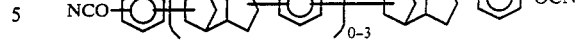

B. Curable Compositions of DCPDPC Resin and Ethylenically Unsaturated Monomers The DCPDPC resin prepared in A above is mixed with differnet ethylenically unsaturated monomers are polymerized and cured according to the information in Table I. Physical properties of the cured resins are compiled in Table II.

TABLE I

| Sample | Composition | Weight Percent | Catalyst/Level[1] | Cure Schedule | Viscosity/Temp.[2] |
|---|---|---|---|---|---|
| A | DCPDPC | 83 | CoNaph/800 | 1 Hr. @ 100° C. | 2700/25° C. |
|   | Styrene | 17 |  | 1 Hr. @ 180° C. |  |
|   |  |  |  | 1 Hr. @ 225° C. |  |
| B | DCPDPC | 79 | CoNaph/800 | 1 Hr. @ 100° C. | 435/25° C. |
|   | Styrene | 21 |  | 1 Hr. @ 180° C. |  |
|   |  |  |  | 1 Hr. @ 225° C. |  |
| C | DCPDPC | 85.5 | CoNaph/130 | 1 Hr. @ 100° C. | 804 cps/50° C. |
|   | Divinylbenzene | 14.5 |  | 1 Hr. @ 175° C. |  |
|   |  |  |  | 2 Hr. @ 225° C. |  |
| D | DCPDPC | 76.5 | CoNaph/132 | 1 Hr. @ 100° C. | 653 cps/25° C. |
|   | Vinyl-toluene | 23.5 |  | 1 Hr. @ 175° C. |  |
|   |  |  |  | 2 Hr. @ 225° C. |  |
| E | DCPDPC | 85.1 | CoNaph/130 | 1 Hr. @ 100° C. | 2580 cps/50° C. |
|   | p-Bromostyrene | 14.9 |  | 1 Hr. @ 175° C. |  |
|   |  |  |  | 2 Hr. @ 225° C. |  |
| C-1* | DCPDPC | 100 |  | 2 Hr. @ 175° C. | Semi-solid/25° C. |
|   |  |  |  | 24 Hr. @ 230° C. |  |

*Not an example of this invention.
[1]CoNaph is Cobalt Naphthanate; catalyst level is in parts per million of total cobalt.
[2]Viscosity of the solution, unless otherwise stated, is Gardener viscosity in cks. as measured at the temperature indicated prior to curing.

TABLE II

| Sample | $T_g$[1] DSC | $T_g$[1] TMA | Degradation[2] Onset Temp. | Flexural Properties[3] Stress | Flexural Properties[3] Modulus | Dielectric[4] Constant | Moisture Resistance[5] |
|---|---|---|---|---|---|---|---|
| A | 216 | — | 406 | 20.5 | 6.0 | 2.77 | 1.7 |
| B | 216 | — | 403 | 21.1 | 6.1 | 2.73 | 1.5 |
| C | 237.3 | 231.6 | 416.3 | 17.2 | 5.5 | 2.86 | 1.0 |
| D | 192.6 | 214.3 | 412.2 | 19.0 | 5.6 | 2.76 | 0.8 |
| E | 215.4 | 226 | 405.8 | 19.0 | 5.8 | 2.90 | 1.0 |
| C-1* | 239.2 | 227.5 | 418.5 | 17.7 | 5.6 | 3.05 | 1.2 |

*Not an example of this invention.
[1]Glass Transition Temperature, measured by Differential Scanning Calorimetry (DSC), and by thermal mechanical analysis (TMA). C-1, according to DSC is an average of three values.
[2]Measured by thermal gravimetric analysis (TGA).
[3]Flexural stress is in psi × $10^{-3}$, and modulus is psi × $10^{-5}$. Both were measured at 21° C., at a strain rate of 0.05 in./minute. C-1 is an average of three values. Samples A and B are average of two values.
[4]Measured at 150° C., and a frequency of 1,000 Hz. C-1 is an average of two values.
[5]Moisture weight gain in steam at 121° C. and 1 atmosphere.

What is claimed is:

1. A curable composition comprising an ethylenically unsaturated monomeric composition; and a major amount of a polyarylcyanate ester composition which has at least two arylcyanate ester moieties bridged by a nonaromatic polycyclic aliphatic moiety; wherein the polyarylcyanate ester composition is substantially soluble in the ethylenically unsaturated monomeric composition.

2. The composition of claim 1, wherein the ethylenically unsaturated composition is in the form of a liquid at 25° C. and atmospheric pressure.

3. The composition of claim 1, wherein the ethylenically unsaturated composition is employed in up to a stoichiometric amount.

4. The composition of claim 2, wherein the ethylenically unsaturated composition is employed in up to a stoichiometric amount.

5. The composition of claim 4, wherein the polyarylcyanate ester composition corresponds to the formula:

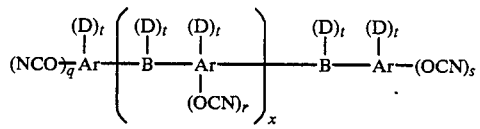

wherein:
Ar is an aromatic moiety;
B is a $C_{7-20}$ polycyclic aliphatic moiety;
D is independently, in each occurrence, any nonactive hydrogen-containing substituent;
q, r and s are independently, in each occurrence, the integer 0, 1, 2, or 3; with the proviso that the sum of q, r and s are at least 2;
t is independently, in each occurrence, an integer of up to 4, inclusive; and
x is a number up to 5, inclusive, and the ethylenically unsaturated monomeric composition is comprised of an ethylenically unsaturated aromatic monomer.

6. The composition of claim 5, wherein the polyarylcyanate ester is the polycyanate ester resin of dicyclopentadiene, which corresponds to the formula

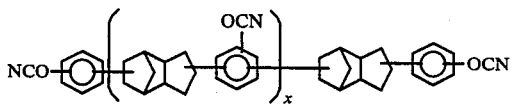

wherein x is a real number of up to 5, inclusive, and the ethylenically unsaturated aromatic monomer is styrene, vinyltoluene, divinylbenzene or p-bromostyrene.

7. The composition of claim 6, wherein the polycyanate resin has an average cyanate functionality of about 2.2, and the ethylenically unsaturated aromatic monomer is present up to about 25 weight percent of the combined weight of the polyarylcyanate ester composition and ethylenically unsaturated monomer.

8. A polymeric composition comprising in polymerized form a curable composition comprising an ethylenically unsaturated monomeric composition; and a polyarylcyanate ester composition which has at least two arylcyanate ester moieties bridged by a nonaromatic polycyclic aliphatic moiety; wherein the polyarylcyanate ester composition is substantially soluble in the ethylenically unsaturated monomeric composition.

9. The polymeric composition of claim 8, wherein the ethylenically unsaturated composition is in the form of a liquid at 25° C. and atmospheric pressure.

10. The polymeric composition of claim 8, wherein the ethylenically unsaturated composition is employed in up to a stoichiometric amount.

11. The polymeric composition of claim 9, wherein the ethylenically unsaturated composition is employed in up to a stoichiometric amount.

12. The polymeric composition of claim 11, wherein the polyarylcyanate ester composition corresponds to the formula:

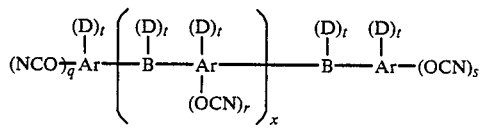

wherein:
Ar is an aromatic moiety;
B is a $C_{7-20}$ polycyclic aliphatic moiety;
D is independently, in each occurrence, any nonactive hydrogen-containing substituent;
q, r and s are independently, in each occurrence, an integer of 0, 1, 2, or 3; with the proviso that the sum of q, r and s are at least 2;
t is independently, in each occurrence, an integer of up to 4, inclusive; and
x is a number up to 5, inclusive, and the ethylenically unsaturated monomeric composition is comprised of an ethylenically unsaturated aromatic monomer.

13. The polymeric composition of claim 12, wherein the polyarylcyanate ester is the polycyanate ester resin of dicyclopentadiene, which corresponds to the formula

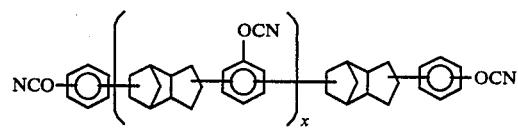

wherein x is a real number of up to 5. inclusive, and the ethylenically unsaturated aromatic monomer is styrene, vinyltoluene, divinylbenzene or p-bromostyrene.

14. The polymeric composition of claim 13, wherein the polycyanate resin has an average cyanate functionality of about 2.2, and the ethylenically unsaturated aromatic monomer is present up to about 25 weight percent of the combined weight of the polyaryl cyanate ester composition and ethylenically unsaturated monomer.

15. The polymeric composition of claim 12, wherein the ethylenically unsaturated composition and the polyarylcyanate ester composition are polymerized to form linking units corresponding to the formula

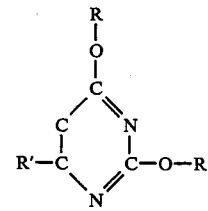

wherein
R is the polycyclic aliphatic bridged polyaryl moiety of the polyarylcyanate ester composition; and
R' is the remainder of the ethylenically unsaturated monomer.

16. The polymeric composition of claim 14, wherein the ethylenically unsaturated monomer is styrene.

17. The polymeric composition of claim 16, wherein the polycyanate resin and styrene are polymerized to form linking units corresponding to the formula

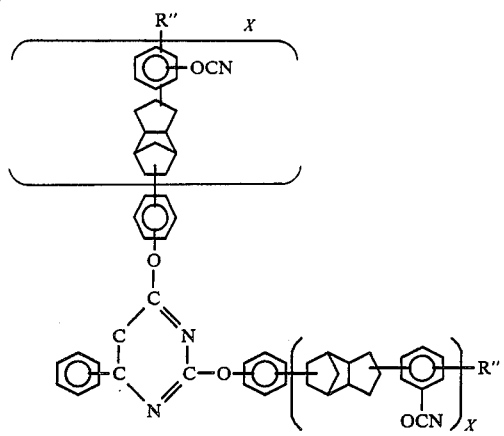
wherein
R″ is the remainder of the polycyanate ester resin, and x is a real number of up to 5, inclusive.
* * * * *